United States Patent [19]

Lanciaux

[11] Patent Number: 4,954,835
[45] Date of Patent: Sep. 4, 1990

[54] RADIODIRECTION FINDING METHOD AND APPARATUS USING DOPPLER EFFECT FREQUENCY MODULATION

[75] Inventor: Jacques Lanciaux, Pibrac, France

[73] Assignee: Rockwell-Collins France, Blagnac, France

[21] Appl. No.: 271,625

[22] Filed: Nov. 15, 1988

Related U.S. Application Data

[63] Continuation of Ser. No. 19,232, Feb. 26, 1987, abandoned.

[30] Foreign Application Priority Data

Aug. 4, 1986 [FR] France .................................. 86 11279

[51] Int. Cl.$^5$ ........................... G01S 3/52; G01S 5/04; G01S 1/44
[52] U.S. Cl. .................................... 342/418; 342/436; 342/406
[58] Field of Search ............... 342/418, 433, 434, 436, 342/401–406, 428, 429

[56] References Cited

U.S. PATENT DOCUMENTS

| | | |
|---|---|---|
| 4,005,427 | 1/1977 | Höfgen . |
| 4,060,809 | 11/1977 | Baghdady ........................... 342/451 |
| 4,143,351 | 3/1979 | Orieux ................................. 342/418 |
| 4,151,529 | 4/1979 | Dorey ................................. 342/405 |
| 4,591,861 | 5/1986 | Kautz ................................. 342/404 |

FOREIGN PATENT DOCUMENTS

| | | |
|---|---|---|
| 1023624 | 3/1966 | United Kingdom . |
| 1323278 | 7/1973 | United Kingdom . |

*Primary Examiner*—Gregory G. Issing
*Attorney, Agent, or Firm*—McAulay Fisher Nissen & Goldberg

[57] ABSTRACT

Radiodirection finding method and apparatus using Doppler effect frequency modulation for measuring the bearing of a source transmitting a high frequency signal, wherein either on the reception side or on the transmission side, several antenna strands are used in pairs diametrically spaced from each other and spaced evenly apart angularly about a circumference. A first pair of diametrically spaced antenna strands are energized and then the next pair of diametrically spaced antenna strands in turn are selectively energized so as to create, at all times, a mobile fictitious antenna moving diametrically and alternately between the two diametrically opposite antenna strands of the particular pair of antenna strands considered. Different pairs of diametrically opposite antenna strands are successively energized in an angularly rotating sequence from the first pair of antenna strands.

18 Claims, 4 Drawing Sheets

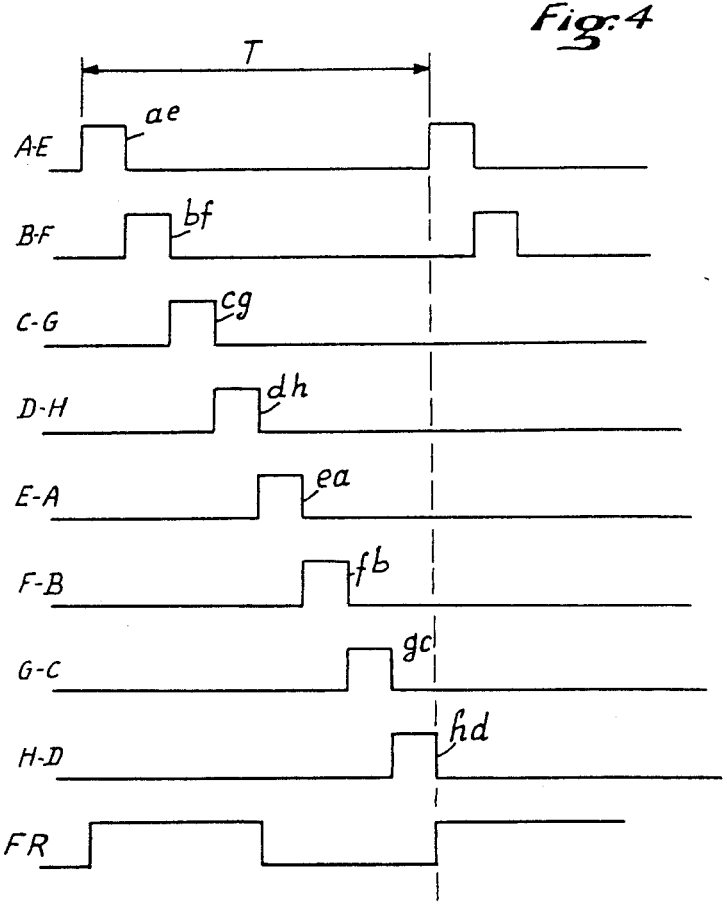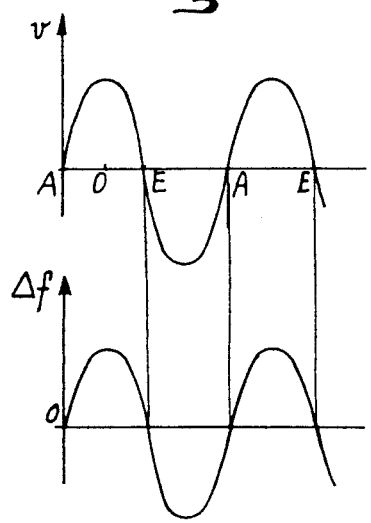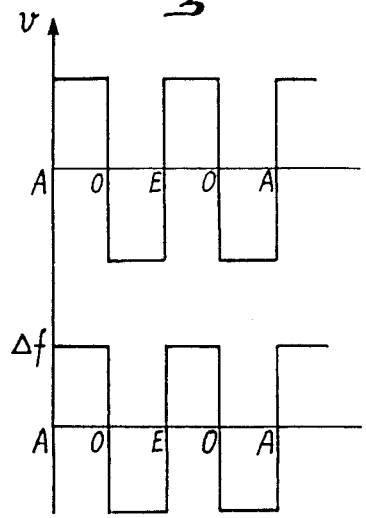

RADIODIRECTION FINDING METHOD AND APPARATUS USING DOPPLER EFFECT FREQUENCY MODULATION

This application is a continuation of application Ser. No. 07/019,232 now abandoned, filed Feb. 26, 1987

BACKGROUND OF THE INVENTION

The present invention relates to a radiodirection finding method and apparatus using Doppler effect frequency modulation.

Different systems of aid to air or sea navigation are already known using Doppler effect frequency modulation. Among the known systems using such modulation may be mentioned the Doppler VOR system operating for transmission and the Rohde and Schwarz direction finder at reception. These systems are based on the switching of a high number of antenna strands (39 antenna strands for the Doppler VOR system and 16 antenna strands for the Rohde and Schwarz system) which are placed about a circumference, at equal distances from each other. These antenna strands are energized in a rotating sequence, in other words one after the other about the circumference, each of the strands being energized for a predetermind lapse of time, which corresponds to the rotation of a fictitious antenna about the center of the circumference. The bearing of a source transmitting a high frequency signal is obtained by measuring the phase shift between an antenna rotation reference signal and the signal obtained from the fictitious rotating antenna, after demodulation by a frequency modulation receiver.

The accuracy of such a direction finding system depends on the number of antenna strands, on the form of the switching signals, on the reproducibility of the circuits associated with eacch antenna strand (switching, amplification, dimensional characteristics) and on the phase stability of the receiver or on a fixed phase shift which may be compensated for.

To overcome the difficulties related to the accuracy required of the devices switching the antenna strands and their controls, the simplest solution consists in increasing the number of antenna strands. In fact, the accuracy required for the shape of control signals and the switching devices is all the more reliable the higher the number of antenna strands. However, this results in a bulky apparatus, and yet does not solve the problem of the phase shift of the receiver.

SUMMARY OF THE INVENTION

The present invention aims at overcoming these drawbacks by providing an apparatus of particularly simple design, compact and inexpensive but still capable of delivering a high performance level.

For this, the direction finding method using Doppler effect frequency modulation for measuring the bearing of a source transmitting a high frequency signal, in which, on the reception side or on the transmission side, several antenna strands are used spaced evenly apart about a circumference and in which these antenna strands are energized in turn so as to create a fictitious mobile antenna, is characterized in that the antenna strands are energized selectively in pairs of diametrically opposite strands so as to create, at all times, a mobile fictitious antenna moving diametrically and alternately between the two opposite antenna strands of the pair of antenna strands considered, and the different pairs of diametrically opposite antenna strands are energized successively in a rotating sequence.

The invention also provides a direction finding apparatus using Doppler effect frequency modulation for measuring the bearing of a source transmitting a high frequency signal, including an even number 2n, at least equal to four, of antenna strands spaced apart evenly about a circumference, a circuit for switching the antenna strands connected to the different antenna strands, a two output switching control circuit which is connected to the switching circuit of the antenna strands so as to selectively energize these strands in turn, a frequency modulation receiver connected to the switching circuit of the antenna strands and to which the frequency modulated signal is applied by switching the antenna strands, means for producing an antenna rotation reference signal , and a module for processing the signal received for delivering, from the phase shift between the signal received and the antenna rotation reference signal, an indication of the bearing of the source emitting the high frequency signal, characterized in that it includes means for producing a sub-carrier frequency signal and for applying this signal, through the switching circuit of the antenna strands, successively to each pair of opposite antenna strands in a rotating sequence, and means for ensuring synchronous demodulation of the sub-carrier at the output of the frequency modulation receiver.

Thus, in the method and apparatus of the invention, instead of switching the antenna strands with a rotating frequency, these strands are switched diametrically by a sub-carrier frequency. The result is that a single proportion switching device is used and that the problem related to the dispersions of the characteristics of the different components is thus eliminated. Furthermore, the apparatus is insensitive to all disymmetries of the amplification and proportional switching device. In fact, if the two branches of the amplification and mixing circuit do not have the same phase shift, this is compensated for automatically by averaging over a revolution, since the inputs are permuted at each half revolution.

The invention allows a small size radiodirection finding antenna to be constructed which is a requirement for correct operation. In fact, so that the amplitude modulation caused by the switching of the diametrically opposite antenna strands is low (less then 10%), the diameter of the antenna must not be greater than a tenth of the wave length.

With the apparatus of the invention, an accuracy better than + or −1° can be obtained on a correct master plan. The accuracy obtained is independent of the phase shift of the receiver.

BRIEF DESCRIPTION OF THE DRAWINGS

One embodiment of the present invention will be described hereafter, by way of non limitative example, with reference to the accompanying drawings in which:

FIG. 4 is a diagram illustrating the switching control signals for the antenna strands and the antenna rotation reference signal, FIGS. 5 and 6 are diagrams illustrating the variation of the frequency of the signal received as a function of the mobile fictitious antenna speed.

DESCRIPTION OF THE PREFERRED EMBODIMENT

Figure 1:
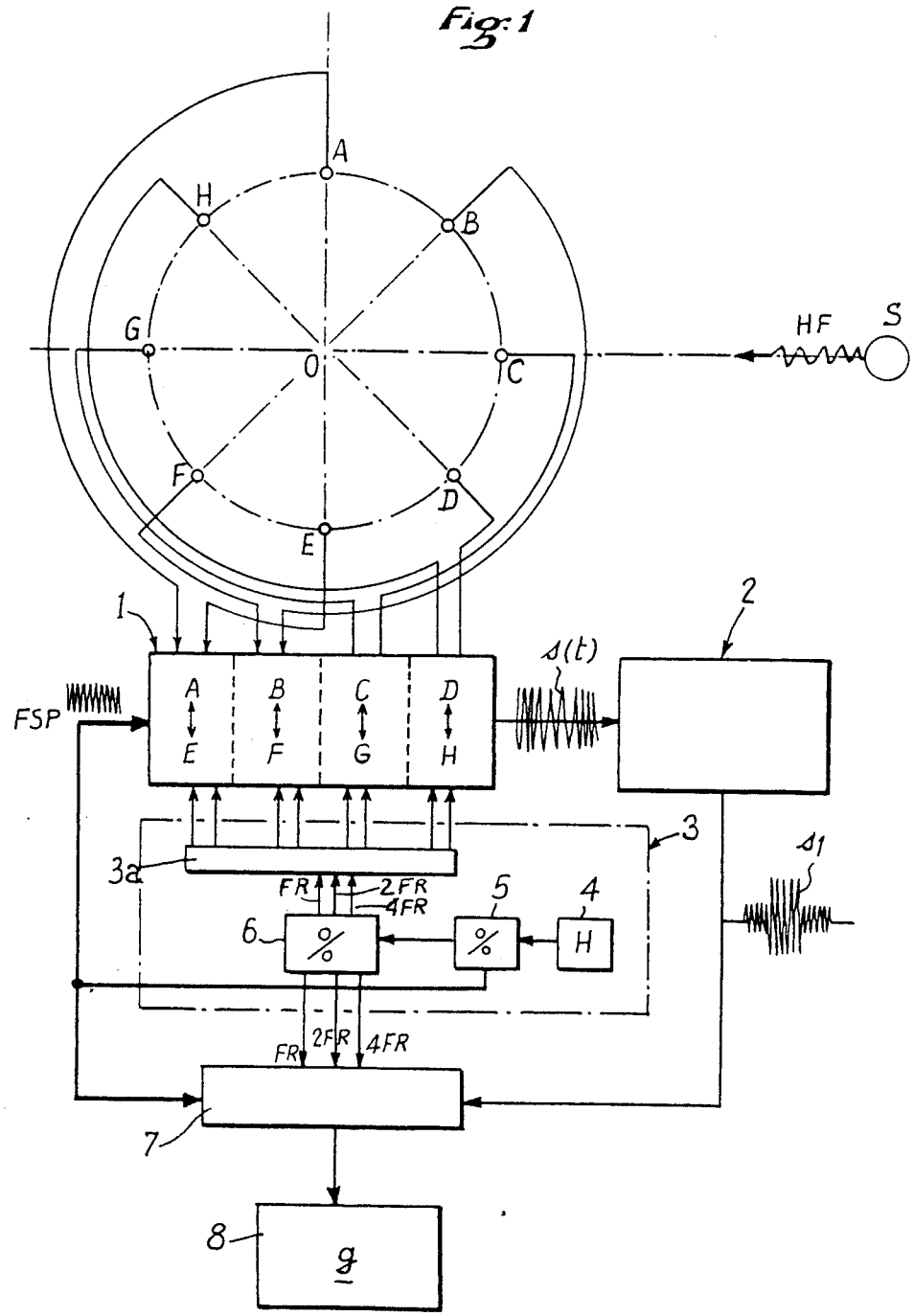
FIG. 1 is a block diagram of a direction finding apparattus of the invention.

The direction finding apparatus of the invention, the general diagram of which is shown in FIG. 1, functions for reception and it is intended to be embarked on board an aircraft for detecting the bearing of a source on the ground S transmitting a high frequency signal, whatever the band used. This apparatus uses an even number 2n of antenna strands at least equal to four, these antenna strands being spaced apart evenly about a circumference. In the non limitative embodiment shown in the drawings, the apparatus uses eight antenna strands disposed diametrically opposite in pairs and spaced apart evenly about the circumference, namely the antenna strands A, B, C, D, E, F, G, and H. These eight antenna strands are connected respectively to a circuit 1 for switching the antenna strands which is itself driven by a control module 3. This control module includes, among other circuits, a switching control circuit 3a which is connected to the switching circuit of the antenna strands 1. The control module 3 also includes a clock 4 which delivers a periodic signal applied to a divider stage 5 whose output produces a sub-carrier of frequency FSP, which is applied to the antenna strands switching circuit 1.

The control module 3 also includes a signal generating stage 6 which is connected to the output of divider 5. This stage 6 produces binary signals of weights, 1, 2, 4 (FR, 2FR, 4FR) which are applied to the switching control circuti 3a for causing the energization sequence of the antenna strands as will be seen hereafter. The signal FR is the antenna rotation frequency signal. These signals FR, 2FR, 4FR are also applied to a processing module 7 which also receives the sub-carrier FSP and whose output is connected to a bearing indicator 8.

Circuit 1 for switching the antenna strands delivers at its output a frequency modulated signal which is applied to a phase or frequency modulation receiver 2. This receiver produces at its output a low frequency amplitude modulated signal which is applied to the processing module 7, for calculating the bearing of source S transmitting the high frequency signal.

In the method of the invention, the antenna strands A-H are not switched one after the other in a rotating sequence, in a conventional way, but on the contrary they are energized by pairs of diametrically opposite antenna strands. In other words, in a first time interval defined by a square wave signal ae (FIG. 4), the first pair of diametrically opposite strands A-E is energized, then during the next square wave signal bf, the second pair BF is energized and so on with a square wave signal cg for the pair C-G and a square wave signal dh for the pair D-H. After a half revolution, the two antenna strands of the first pair A-E are again enerigized but with a phase shift of 180° of the sub-carrier FSP, under the control of a square wave signal ea as can be seen in the diagram of FIG. 4. The square wave signal ea is followed by similar signals fb, gc and hd for the pairs of antenna F-B, G-C and H-B. There can also be seen in this diagram the signal FR which is a logic signal whose period T corresponds to a complete revolution or to the complete switching of the antenna strands, i.e. to the eight successive square wave signals ae, bf, cg, dh, ea, fb, gc and hd.

Figure 3:
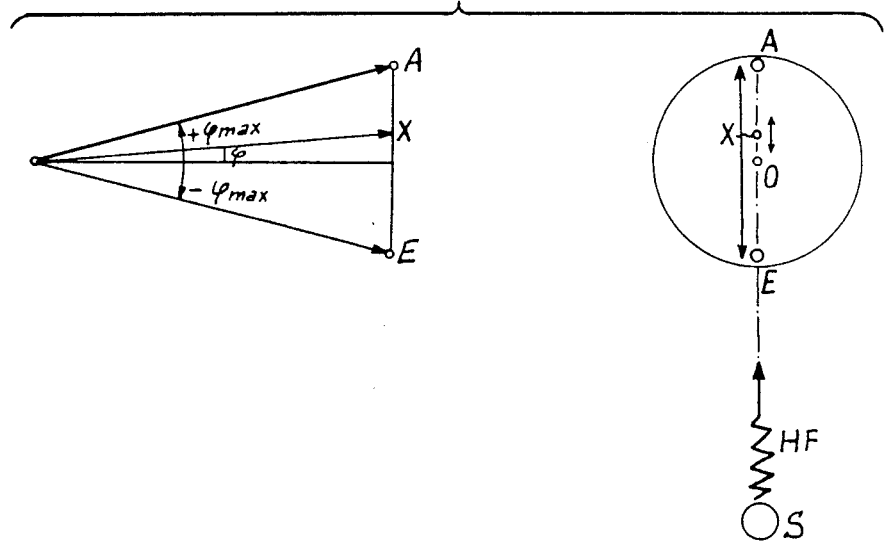
FIG. 3 is a diagram illustrating the phase variation of a signal picked up as a function of the position of the mobile fictitious antenna.

FIG. 3 illustrates the basic principle used in the method and apparatus of the invention. It will be assumed in this case that the pair of antenna strands A-E is energized and that the source S transmitting the high frequency signal is aligned with the direction AE. The alternate energization of the antenna strands A-E results in the creation of a fictitious antenna X reciprocating along the diameter AE. The vectorial diagram of FIG. 3 shows the variation of the phase $\phi$ of the signal received as a function of the position of the fictitious antenna X. This phase varies from a value $-\phi$ max when the fictitious antenna X is at position of the antenna strand E and a value $+\phi$ max when the mobile fictitious antenna X is at the position of the antenna strand A, while passing through a zero value when the fictitious antenna X is at the center O.

The diagram of FIG. 5 illustrates the variation of the speed of movement v of the fictitious antenna X, which is zero at the position of the antenna strands A and E and maximum at the center O, and that of the frequency deviation $\Delta f$ of the received signal. These variations, generated by the sub-carrier frequency, may be sinusoidal as is ahown in FIG. 5, or else be in the form of periodic square signals as is shown in FIG. 6, or else having any other form, particularly triangular, compatible with the demodulation possibilities of the receiver. In all cases, the frequency deviation signal $\Delta f$ is in phase with the speed signal v.

Figure 2:
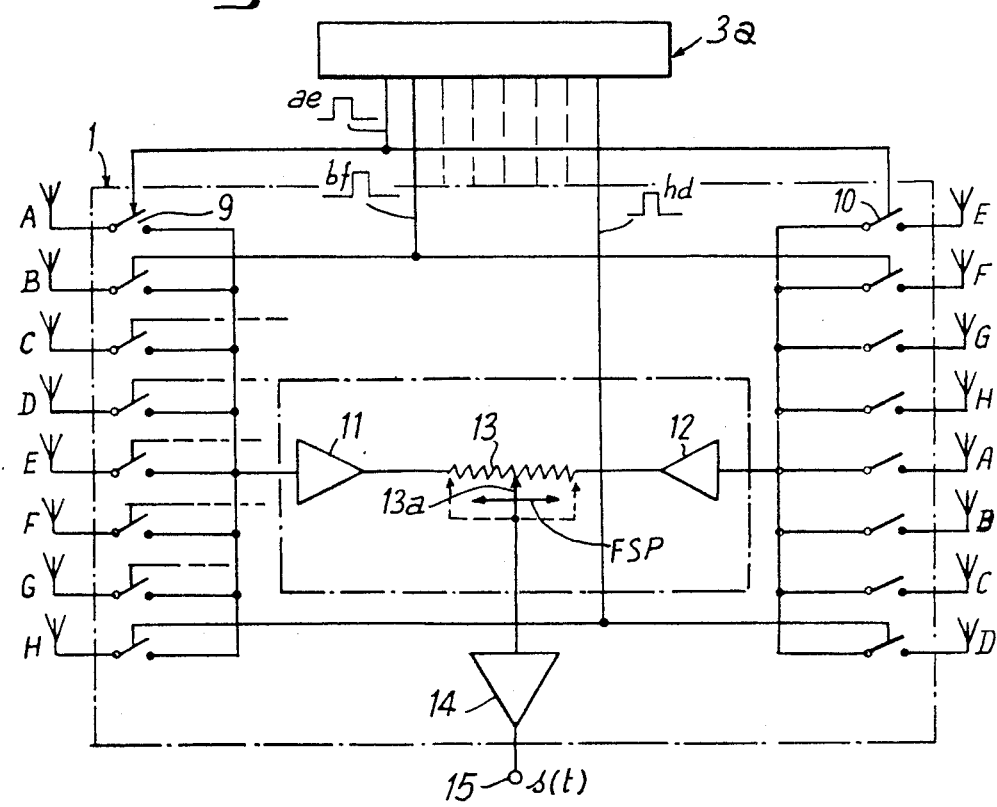
FIG. 2 is a diagram of the switching control circuit for the antenna strands.

The pairs of antenna strands are switched as illustrated in FIG. 2. The switching control circuit 3a delivers respectively, at eight outputs, the eight antenna switching control signals ae, bf . . . hd. These antenna switching signals are applied, inside the antenna strand switching circuit 1, to pairs of normally open swwitches 9, 10, of any known type, for example PIN diodes, and which are respectively connected to the opposite antenna strands of the same pair. For example, all the left hand switches 9 in FIG. 2 are connected respectively to the antenna strands in the order A, B . . . H whereas all the switches 10 situated on the right side of FIG. 2 are connected respectively to the antenna strands in the order E, F, G, H, A, B, C, D. Thus, the first square wave signal ae controls the closing of the two switched 9, 10 connected respectively to the two antenna strands A and E, and so on for the following square wave signals bf. . . hd. All the left hand switches 9 are connected in common to an input of an amplifier 11 whereas all the right hand switches 10 are connected in common to an input of an amplifier 12, these two amplifiers 11, 12 forming part of a stage providing diametrical switching of the antenna strands by the sub-carrier frequency signal FSP. For the purposes of illustration the outputs of the two amplifiers 11 and 12 are shown as being connected to the two ends of a potentiometer 13 whose slider 13a is moved alternately between the two ends of this potentiometer 13, at the frequency of the sub-carrier FSP. However, it is obvious that in practice switching by the sub-carrier FSP may be provided by any electronic circuit known per se (for example PIN diodes). The slider 13a is connected to an amplifier 14 whose output is connected to a terminal 15 where the modulated frequency signal s(t) appears and which is a combination of the two signals received respectively by the two antenna strands energized at a given time, for example strands A and E. If k is a coefficient defining the instantaneous position of the slider 13a, we have $s(t) = k\, sA(t) + (1-k)\, sE(t)$, sA(t) and sE(t) being the two signals respectively received by the two antenna strands A and E as a function of the time t.

Figure 7:
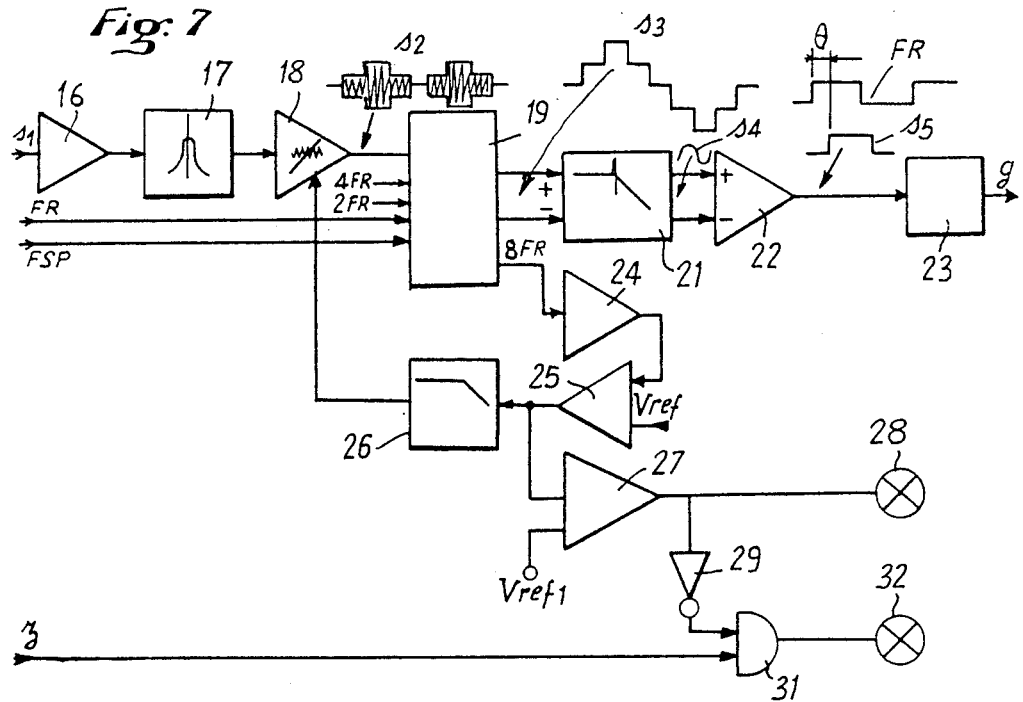
FIG. 7 is a block diagram of the signal processing module.
Figure 8:
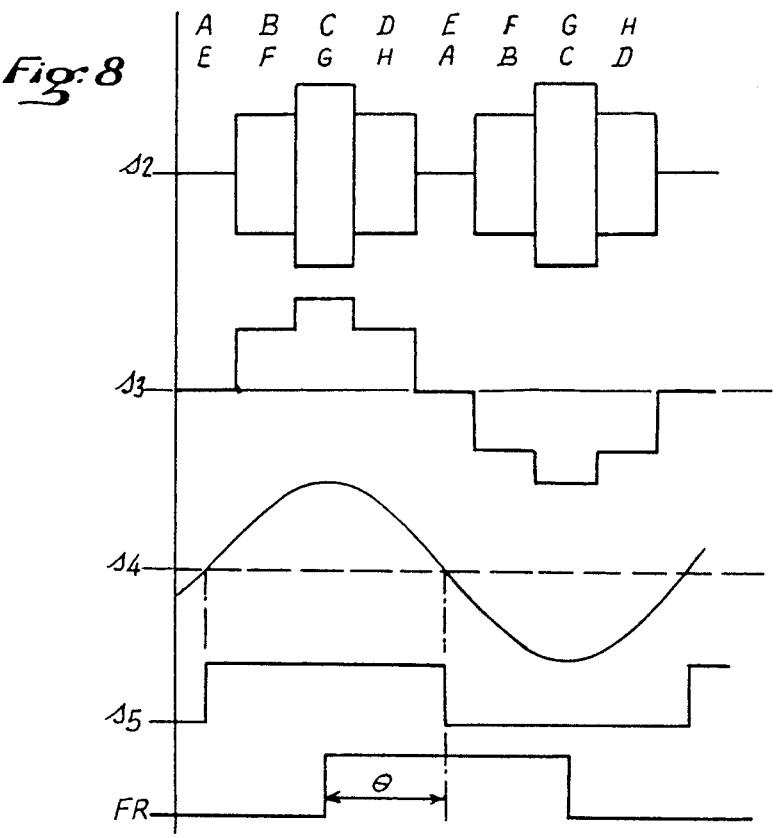
FIG. 8 is a diagram illustrating different forms of signals appearing in the processing module.

The modulated frequency signal s(t) is applied to the frequency modulation receiver 2 which delivers at its output a low frequency amplitude modulated signal s1. This signal is applied to the processing module 7 which includes (FIG. 7) an amplifier 16 to which the signal s1 is applied, then a band pass filter 17, then a variable gain amplifier 18 which delivers at its output an amplitude modulation signal s2 (FIG. 8). The signal s2 is shown as corresponding to a high frequency signal source aligned with the antenna strands C-G, that is situated in the direction GC, the antenna strands C being the closest to source S. Thus, when the first pair of antenna strands A-E is energized, there is no frequency modulation of the signal received because the direction AE is perpendicular to the direction GC along which source S is located. The amplitude of the first signal on each plateau during rotation is proportional to the absolute value of the cosine of the angle between the direction of the transmitter of the high frequency signal and the direction of the selected antenna strands. The signal is therefore maximum if the angle formed is zero and on the contrary this signal is zero if the selected antenna strands are situated along the direction perpendicular to the direction of the transmitter. The phase shift of the sub-carrier is zero if the transmitter is in the front sector and 180° if the transmitter is in the rear sector.

Signal s2 is applied to a synchronous filter 19, jointly with the sub-carrier frequency signal FSP and the signal FR, 2FR and 4FR. The synchronous filter 19 delivers at its output a staircase signal s3 representing the amplitude plateau of the signal received for the different pairs of antenna strands, this signal being applied to a low pass filter 21 which delivers at its output a sinusoidal signal s4 as can be seen in FIG. 8. This sinusoidal signal s4 is applied to a comparator 22 which produces at its output a measurement signal s5 formed by a square wave which is phase shifted by an angle $\theta$ with respect to the rotation reference signal FR. This measurement signal s5 is applied to a stage 23 which calculates, from the phase shift $\theta$, the value of the bearing g with respect to the reference direction AE (in the present case g=90°).

The processing module also includes a loop controlling the gain of the amplifier 18. This loop includes an amplifier 24 receiving at its input a signal 8FR from the synchronous filter 19, and the output of which is connected to an input of a comparator 25 receiving, at a second input, a reference voltage Vref corresponding to the desired output voltage level for the amplifier 18. The output of comparator 25 is connected on the one hand to a control input of the variable gain amplifier 18, through a low pass filter 26, and on the other hand to an input of a detector 27 detecting the level of the control signal, which also receives at a second input a reference voltage Vref 1. The output of the level detector 27 is connected dirently to an indicator lamp 28 indicating validity of the bearing and, through an inverter 29, to an input of an AND gate having two inputs 31. The other input of this AND gate receives a signal z indicating the reception of the high frequency signal by the receiver. The output of this AND gate is connected to an indicator lamp 32 forming a vertical indicator.

Consequently, when the aircraft carrying the apparatus of the invention passes vertically over the source S of signal HF, this indication of the vertical passage is shown by the indicator lamp 32 lighting up. In effect, the stage 27 of the level detector delivers a zero output signal, so that the bearing validity lamp 28 is extinguished. On the other hand, this signal is applied, after inversion by the inverter 29, to the first input of the AND gate 31 which receives at its other input the signal z indicating the presence of the signal HF emitted by source S. The gate 31 is then enabled and it causes the indicator lamp 32 to light up indicating the passage of the aircraft vertically over the source S.

The bearing validity indicator lamp 28 lights up as long as the aircraft is in the reception zone of the signal HF and it is extinguished as soon as the aircraft leaves the zone, which is signalled by the disappearance of the audio signal s1.

What is claimed is:

1. A radiodirection finding method using Doppler effect frequency modulation for measuring the bearing of a source transmitting a high frequency signal, including a pair of real antennas, one of said antennas functioning as a reception antenna and the other of said antennas functioning as a transmission antenna, each of said antennas including several antenna strands, and said antenna strands being used in pairs diametrically spaced from each other and spaced evenly apart angularly about a circumference, and a fictitious mobile antenna having a periodic linear alternative movement between each pair of said pair of real antennas and a sampling of directions following a rotary cycle, and comprising the steps of:

selectively energizing each next adjacent pair of the diametrically spaced antenna strands sequentially in said rotary cycle in pairs of diametrically opposite strands; and energizing the different selective pairs of diametrically opposite antenna strands successively in a angularly rotating sequence in said rotary cycle from said first pair of antenna strands energized, wherein a selection to a next direction occurs when said fictitious antenna crosses a center of a circle for avoiding any tangential movement.

2. The method of claim 1, including energizing a first pair of diametrically opposite strands in a first time interval defined by a square wave signal, energizing a second pair of diametrically opposite strands in a second time interval defined by a second square wave signal, and energizing an nth pair of diametrically opposite strands until all pairs of diametrically opposite strands are energized in sequential order along the circumference so that an antenna with strands AE, BF, CG and DH, are diametrically switched from eacch other and are energized sequentially AE, BF, CG, DH, EA, FB, GC and HD.

3. The method of claim 1, including transforming a phase shift into a frequency modulation, and obtaining the frequency modulation by Doppler effect by simulating alternate rectilinear movement of the fictitious antenna successively following n directions.

4. A radiodirection finding apparatus using Doppler effect frequency modulation for measuring the bearing of a source transmitting a high frequency signal in order to minimize the overall dimensions, including:

antenna means including an even number 2n of antenna strands at least equal to four, wherein n is at least two and there is an even number of said antenna strands for forming pairs of diametrically opposed antenna strands at least equal to four, said antenna strands being disposed diametrically opposite in pairs, each pair of said antenna strands being spaced apart angularly from each next adjacent strand and evenly about a circumference, said antenna strands having a periodic linear alternative movement and a sampling of directions following a rotary cycle;

switching circuit means for switching from one pair of antenna strands to the next adjacent pair of antenna strands;

control module means driving said switching circuit means for switching from one pair of said diametrically opposed antenna strands to the next adjacent pair of diametrically opposed antenna strands;

frequency modulation receiver means connected to said switching circuit means;

means for applying a frequency modulated signal from said switching circuit means to said frequency modulated receiver means by switch said antenna strands, said frequency modulated receiver means producing a low frequency amplitude modulated signal;

means for producing an antenna strands rotation reference signal;

bearing indicator means;

module means coupled to said bearing indicator means and said switching control means for processing the signal received therefrom for delivering, from the phase shift between the signal received and the antenna rotation reference signal, an indication of the bearing of the source emitting the high frequency signal;

means for producing a sub-carrier frequency signal and for applying thereof, through said switching circuit means for said antenna strands, successively to each pair of opposite diametrically opposed antenna strands in a rotating sequence; and means for ensuring synchronous demodulation of the sub-carrier at the output of said frequency modulation receiver means;

said antenna strands switching circuit means including 2n pairs of switches controlled respectively by the 2n outputs of the switching control means, control signals appearing successively and respectively, at each revolution, on each pair of switches connected both to an associated strand pair and to a stage for mixing signals from the antenna strands of each pair by said sub-carrier frequency signal.

5. The apparatus of claim 4, wherein said control module means includes a signal generating stage, a clock and a divider stage, said clock delivering a periodic signal which is applied to said divider stage, said divider stage producing a sub-carrier frequency which is applied to said switching circuit means, and a signal generating stage producing binary signals of weights 1, 2, 4 which are applied to said control module means for causing the energization sequence of said antenna strands, said signal generating stage providing an output logic signal having a period T corresponding to a complete switching of all antenna strands through one complete revolution of circumference.

6. The apparatus of claim 4, wherein said processing module means is coupled to the output of said frequency modulated receiver for receiving said low frequency amplitude modulated signal to calculate the bearing of the source transmitting the high frewquency signal.

7. The apparatus of claim 5, wherein said processing module means is coupled to the output of said frequency modulated receiver for receiving said low frequency amplitude modulated signal to calculate the bearing of the source transmitting the high frequency signal.

8. The apparatus of claim 4, including a pair of amplifiers, one of said amplifiers being connected to one of the pairs of antenna strands and the other of said amplifiers being connected to the other of the pair of antenna strands and coupled with the output sub-carrier frequency of said frequency modulation receiver for switching from one pair of said antenna strands to the next pair of said antenna strands.

9. The apparatus of claim 5, including a pair of amplifiers, one of said amplifiers being connected to one of the strands of the pairs of antenna strands and the other of said amplifiers being connected to the other strands of the pairs of antenna strands and coupled with the output sub-carrier frequency of said frequency modulation receiver for switching from one pair of said antenna strands to the next pair of said antenna strands.

10. A radiodirection finding system using Doppler effect frequency modulation for measuring a bearing of a source transmitting a high frequency signal, comprising:

providing for a linear alternative periodic movement of a fictitious mobile antenna between a pair of two real antennas for sampling a projection of a propagation sector on a direction defined by said pair of two real antennas;

arranging each of said pairs of real antennas in a circle for minimizing overall dimensions;

said fictitious antenna performing an integer period of movement on a diameter coinciding on said direction defined by said pair of two real antennas and a selection to a next direction occurring when said fictitious antenna crosses a center of a circle for avoiding any tangential movement;

N direction samples being performed in any sequence or following a circular sequence, the resulting high frequency signal being demodulated by a receiver;

said N direction sampling being performed sequentially on N directions defined by N pairs of real antennas disposed at equiangular intervals, and said N pairs is at least equal to 2; and a processing unit for extracting a bearing of a radio source by a coherent demodulation of a low frequency signal present on an output of a receiver with an antenna movement control signal.

11. The system of claim 10, including using a single mixer for creating a linear alternative movement of the fictitious antenna in said direction defined by a line which joins said pair of two real antennas, said mixer consisting of two attenuators and a dual input adding circuit, each said attenuator having an output connected to one of said inputs of said adding circuit, said pairs of real antennas being spaced less than a quarter wave length from each other, and a low frequency periodic signal for controlling said two attenuators in opposite phase for providing an output signal from said adding circuit steady in amplitude and modulated in phase within the range defined by the phase of said pairs of real antennas and said pairs of real antennas.

12. The system of claim 10, wherein each input to said mixer is connected to one said antenna of said pairs of real antennas of the activated pairs of real antennas, and a low frequency signal controls said mixer to simulate an alternative movement of said fictitious antenna on a line joining said two real antennas, and a next pair of said pair of real antennas is switched on when said fictitious antenna crosses the center.

13. The system of claim 10, wherein said two real antennas and a mixer are used to produce a linear movement, and a sub-carrier frequency is produced which is applied to the antenna strands through a switching circuit thereof.

14. The system according to claim 10, including using Doppler effect and the movement of said fictitious antenna to transmit a radio frequency signal.

15. The system as claimed in claim 11, using the movement of said fictitious antenna for transmitting a radio frequency signal.

16. A radio navigation system using the movement of said fictitious antenna as defined in the radiodirection finding system of claim 10 for transmitting a radio frequency signal.

17. A radio navigation system using the movement of said fictitious antenna as defined in the radiodirection finding system of claim 11 for transmitting a radio frequency signal.

18. The system as claimed in claim 10, including using the movement of said fictitious antenna for transmitting a radio frequency signal.

* * * * *